United States Patent [19]

Haskins

[11] Patent Number: 5,578,393

[45] Date of Patent: Nov. 26, 1996

[54] THERMAL CONTACT SHEET FOR HIGH TEMPERATURE BATTERIES

[75] Inventor: Harold J. Haskins, Ann Arbor, Mich.

[73] Assignee: United States Advanced Battery Consortium, Dearborn, Mich.

[21] Appl. No.: 401,718

[22] Filed: Mar. 10, 1995

[51] Int. Cl.[6] .......................... H01M 10/50; H01M 10/42
[52] U.S. Cl. ................... 429/120; 429/52; 429/62
[58] Field of Search .................. 429/52, 62, 120

[56] References Cited

U.S. PATENT DOCUMENTS

| | | | |
|---|---|---|---|
| 3,669,745 | 6/1972 | Beccu | 136/20 |
| 3,822,150 | 7/1974 | Beardshear | 136/161 |
| 3,824,131 | 7/1974 | Beccu | 136/20 |
| 3,964,920 | 6/1976 | Davis et al. | 106/53 |
| 3,966,492 | 6/1976 | Ludwig | 136/6 |
| 3,970,464 | 7/1976 | Shell | 106/47 |
| 3,993,503 | 11/1976 | Ludwig | 429/103 |
| 3,994,745 | 11/1976 | Ludwig | 429/81 |
| 4,002,806 | 1/1977 | Gupta et al. | 429/104 |
| 4,002,807 | 1/1977 | Ludwig | 429/104 |
| 4,038,465 | 7/1977 | Ludwig et al. | 429/104 |
| 4,048,393 | 7/1977 | Heintz et al. | 429/104 |
| 4,048,394 | 9/1977 | Ludwig | 429/104 |
| 4,084,041 | 4/1978 | Ludwig | 429/104 |
| 4,084,042 | 4/1978 | Ludwig | 429/104 |
| 4,091,151 | 5/1978 | Minck | 429/104 |
| 4,091,190 | 5/1978 | Heintz | 429/176 |
| 4,166,156 | 8/1979 | Ludwig | 429/104 |
| 4,169,919 | 10/1979 | Topouzian | 429/104 |
| 4,192,911 | 3/1980 | Topouzian | 429/104 |
| 4,197,363 | 4/1980 | Topouzian et al. | 429/104 |
| 4,198,444 | 4/1980 | Yerman | 427/95 |
| 4,226,923 | 10/1980 | Mikkor | 429/104 |
| 4,245,012 | 1/1981 | Mikkor | 429/104 |
| 4,247,605 | 1/1981 | Paquette | 429/52 |
| 4,248,943 | 2/1981 | Ludwig et al. | 429/104 |
| 4,278,708 | 7/1981 | Mikkor et al. | 427/126 |
| 4,290,192 | 9/1981 | Elkins | 29/623.5 |
| 4,315,054 | 2/1982 | Sack et al. | 428/433 |
| 4,374,391 | 2/1983 | Camlibel et al. | 357/17 |
| 4,375,127 | 3/1983 | Elkins et al. | 29/623.5 |
| 4,431,561 | 2/1984 | Ovshinsky et al. | 252/184 |
| 4,456,631 | 6/1984 | Crosbie et al. | 429/104 |
| 4,456,664 | 6/1984 | Crosbie et al. | 429/104 |
| 4,551,400 | 11/1985 | Sapru et al. | 429/94 |
| 4,568,502 | 2/1986 | Theodore et al. | 264/63 |
| 4,615,851 | 10/1986 | Theodore et al. | 264/63 |
| 4,637,967 | 1/1987 | Keem et al. | 429/101 |
| 4,649,022 | 3/1987 | Tischer et al. | 419/24 |
| 4,731,293 | 3/1988 | Ekholm et al. | 428/426 |
| 4,735,784 | 4/1988 | Davis et al. | 423/111 |
| 4,755,313 | 7/1988 | Wahl et al. | 252/62 |
| 4,883,726 | 11/1989 | Peled et al. | 429/120 |
| 4,948,679 | 8/1990 | Hunt et al. | 429/120 |
| 5,107,649 | 4/1992 | Benson et al. | 52/309.4 |
| 5,143,803 | 9/1992 | Andres et al. | 429/120 |
| 5,157,893 | 10/1992 | Benson et al. | 52/792 |
| 5,158,841 | 10/1992 | Mennicke et al. | 429/120 |
| 5,175,925 | 1/1993 | Grosklos et al. | 29/753 |
| 5,223,851 | 6/1993 | Hadden et al. | 343/873 |
| 5,347,816 | 9/1994 | Nelson et al. | 429/120 |

OTHER PUBLICATIONS

"Hydrogen Storage in Metal Hydride", *Scientific America*, vol. 242, No. 2, pp. 118–129, Feb., 1980.
"A New Hydrogen Storage Electrode", Bronoel, et al, *International Journal of* Hydrogen Energy, vol. 1, pp. 251–254, Pergamon Press, 1976 month unknown.
*Materials Handbook,* 12th Edition, G. S. Brady and H. R. Clauser, ed. McGraw Hill, 1986, p. 360 month unknown.

Primary Examiner—Prince Willis, Jr.
Assistant Examiner—Carol Chaney
Attorney, Agent, or Firm—Brooks & Kushman P.C.

[57] ABSTRACT

A high temperature battery has battery cells designed to generate electricity electrochemically at a temperature greater than room temperature. The battery has a housing containing the cells. A glass contact member is positioned between the cells and the housing, the glass contact member being solid at ambient temperature and pressure but capable of flow at the operating temperature of the cells and being resistant to flow of electricity therethrough. A method of controlling the temperature of a high temperature battery uses the above-recited structure and permits heat removal from the cells in a controlled manner.

12 Claims, 1 Drawing Sheet

THERMAL CONTACT SHEET FOR HIGH TEMPERATURE BATTERIES

TECHNICAL FIELD

The present invention is concerned with the field of temperature control in batteries. More specifically, the invention is concerned with the use of insulation in high temperature batteries.

BACKGROUND OF THE INVENTION

U.S. Pat. No. 4,247,605, Paquette, discloses a method of forming and starting a sodium sulfur battery when heated to a temperature suitable for battery operation. Similarly, U.S. Pat. No. 4,226,923, Mikkor, discloses a method of forming a volume efficient sodium sulfur battery.

Existing liquids and pliable solid sheet materials will degrade thermally at an unacceptable rate in this environment. Furthermore, many of the existing materials are combustible in air at the battery operating temperatures. Therefore, there is a need for inert, electrically resistant materials stable in the higher temperature battery environment.

SUMMARY OF THE INVENTION

The present invention is concerned with a high temperature battery comprising: battery cells designed to generate electricity electrochemically at a temperature greater than room temperature; a housing containing the cells; and, positioned between the cells and the housing, a glass contact member which is solid at ambient temperature and pressure but capable of flow at the operating temperature of the cells and is resistant to flow of electricity therethrough.

The case is also concerned with a method of controlling the temperature of a high temperature battery having battery cells designed to generate electricity electrochemically at a temperature greater than room temperature and a housing containing the cells, comprising: positioning, between the cells and the housing, a glass contact member which is solid at ambient temperature and pressure but capable of flow at the operating temperature of the cells and is resistant to flow of electricity therethrough, so that as the battery generates heat during operation, the glass contact member continues its contact with the cells and permits heat removal from the cells in a controlled manner.

DESCRIPTION OF THE PREFERRED EMBODIMENT

High temperature batteries (e.g., Na/S and Na/NiCl$_2$) operate at internal temperatures up to 350° C. or higher, contained within an insulating enclosure. The battery cells within the enclosure must be heated and cooled to keep them at the proper temperature during all phases of operation. Typically, a heater/cooling plate is located under the cell pack to provide these functions. Since the battery cells have metal cases which are electrically active in the battery circuit, the heater/cooling plate must be electrically insulated from the cell pack. This can be accomplished using such insulating materials as mica sheet or glass fiber cloth. However, such electrical insulating sheets impede the desired heat transfer between the cells and the heater/cooling plate due to thermal contact resistance at the cell/insulation and insulation/plate interfaces. Also, the multi-cell pack may not have a uniformly planar surface for contacting the insulating sheet.

For a glass contact member, the present invention uses a glass fiber cloth sheet impregnated with a low melting point glass (as used for encapsulation of electronic components) which is electrically insulating. The glass contact member uses glass fibers as a structural support. At the operating temperature of the battery, the low melting point component liquifies, providing intimate contact for heat transfer at the interfaces described above.

Figure 1:
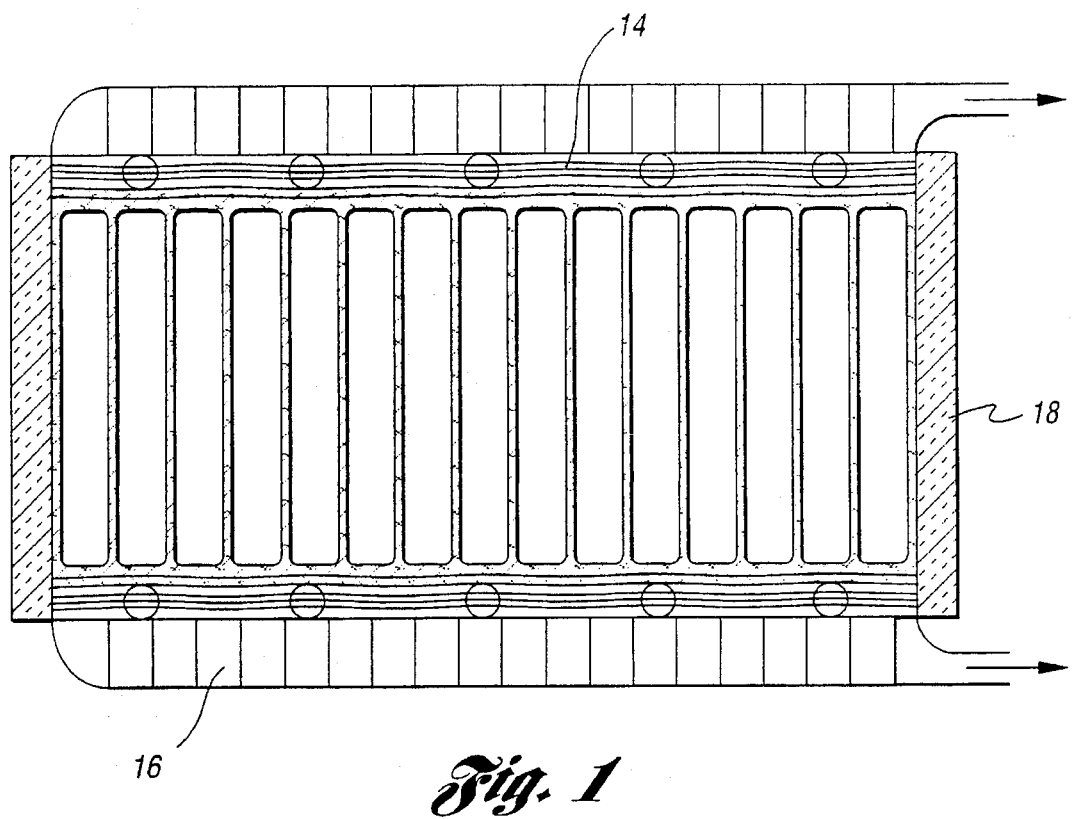
FIG. 1 is a cross-section of a battery according to the present invention.
Figure 2:
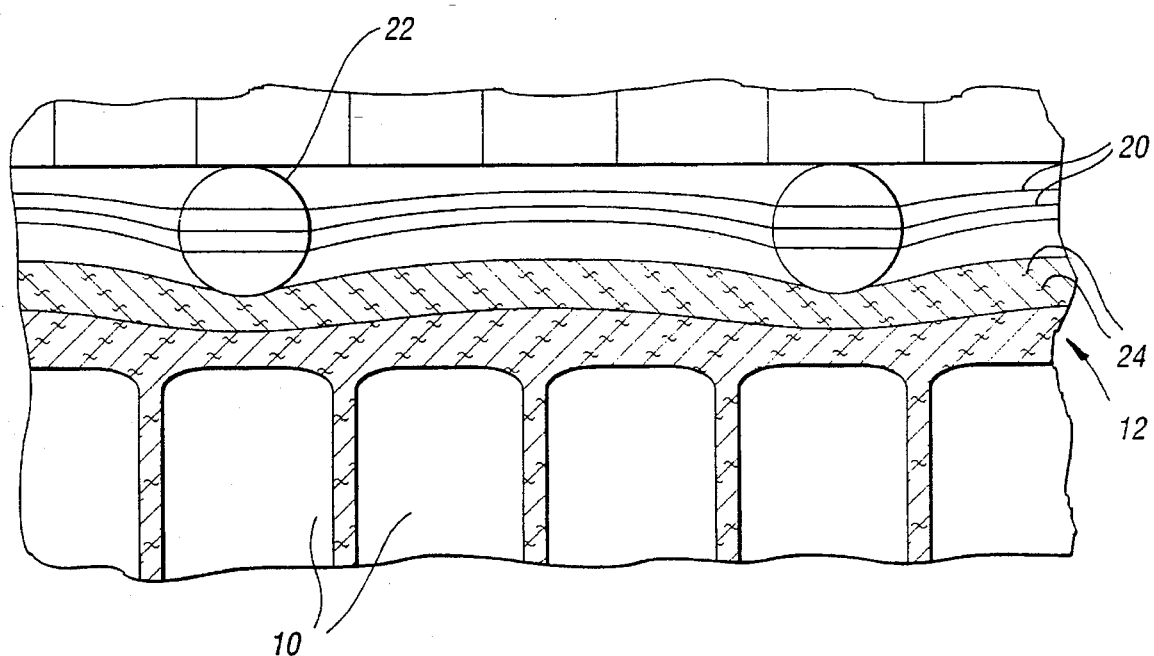
FIG. 2 is a partial cut away section taken from FIG. 1 according to the present invention.

Turning now to the drawings, FIGS. 1 and 2 show a typical installation of the thermal contact sheets 12 in a high temperature battery. The battery assembly includes (1) a core of battery cells 10; (2) thermal contact sheets 12 on the top and bottom of the core assembly; (3) low conductance thermal insulation 18 around the sides of the core; (4) variable conductance thermal insulation 14 over the top and bottom of the core and (5) cooling jackets 16 attached to the outside of the variable conductance insulation 14 for circulation of a water/glycol coolant such as ethylene glycol and water.

Typical battery systems that might use this type of construction include sodium-sulfur (at 300°–350° C.), sodium-nickel chloride (at 280°–360° C.), and lithium-iron disulfide (at 400°–450° C.). The variable conductance thermal insulation 14 consists of a sealed envelope supported internally against the atmospheric pressure loads by an array of low conductance ceramic supports, and radiative heat transfer is blocked by layers of thin metal radiation shields 20. Thermal conductance through this insulation is controlled electronically by changing the temperature of a small container of metal hydride 22 within the envelope. The hydride reversibly absorbs and desorbs hydrogen to produce a hydrogen pressure typically within the range from less than $10^{-6}$ to as much as 1 torr.

Low pressure hydrogen gas is introduced into the envelope and the envelope is made conductive. The pressure of hydrogen is electrically controlled by heating a small container of metal hydride 22 such as zirconium hydride. Such hydrides produce thermodynamically determined, equilibrium hydrogen pressures that are a predictable function of the hydride temperature.

Hydrogen gas has a very high thermal conductivity, even at pressures of less than $10^{-5}$ atm, so that a very small amount of hydrogen is sufficient to fill a large vacuum insulation enclosure and make it thermally conductive. When the hydride is allowed to cool, it will quickly reabsorb the hydrogen, re-establishing the vacuum and restoring the thermal resistance of the insulation. Control of the thermal conductance is continuously adjustable by controlling the hydride temperature.

A large number of metal hydrides could be considered for use in a variable conductance thermal insulation 14.

U.S. Pat. No. 3,669,745 indicates that metals of the fourth group of transition elements are particularly suitable for taking up large amounts of hydrogen, the ratio by weight of metal to hydrogen being particularly favorable in the case of titanium hydride (TiH$_2$). The metals of the third and fifth groups of the transition elements have favorable properties in relation to low activation energy for hydride formation and decomposition thus rendering them particularly suitable for hydrogen absorption and delivery. Such hydrogen storage component mixtures consist of titanium hydride or zirconium hydride and hydrides of the rare earths such as cerium hydride and lanthanum hydride or mixtures of titanium hydride with vanadium hydride or tantalum hydride.

See also the paper "Hydrogen Storage in Metal Hydride", SCIENTIFIC AMERICA, Vol. 242, No 2, pp 118–129, February, 1980.

U.S. Pat. No. 4,637,967 contemplates compositions of disordered materials for storing hydrogen. Such compositions include titanium and nickel with at least one other component such as zirconium, aluminum, tin, indium, lead, rare earth metals, cobalt, chromium, vanadium, niobium, magnesium, molybdenum, palladium, silicone, boron, carbon and hafnium.

See also INTERNATIONAL JOURNAL OF HYDROGEN ENERGY, Vol. 1, pp. 251–254, Pergamon Press, 1976 in an article entitled "A New Hydrogen Storage Electrode" by Bronoel, Sarradin, Bonnemay, Peocheron, Achard, and Schlapbach describing lanthanum nickel materials.

See also U.S. Pat. No. 3,824,131 pertaining to titanium nickel alloy hydride materials for hydrogen storage wherein vanadium and chromium may be a partial substitute for titanium and copper, cobalt and iron as a partial substitute for nickel. See also U.S. Pat. Nos. 4,431,561 and 4,551,400, hereby incorporated by reference.

Commercially available zirconium alloys, such as ZrVFe, may be used as a fine powder contained within a porous stainless steel cylinder containing a ceramic insulated, tungsten heater coil.

When the battery is not in use, or has relatively low charge or discharge currents, the variable conductance thermal insulation 14 is switched into the insulative mode. This minimizes the heat loss rate from the core to ambient. Under heavy sustained discharge or recharge currents, the battery will dissipate heat at a rate that would result in overheating of the battery core unless heat is removed. To do this, the variable conductance thermal insulation 14 is switched into the conductive mode, which increases the effective thermal conductivity of the material by a factor of up to 100. At the same time, the external coolant is pumped through the cooling jackets 16 to remove excess heat from the battery by exchange to ambient air in a conventional radiator. Typically, the sides of the battery are not used to remove heat in this matter, due to the need to maintain approximately uniform temperatures across the battery core.

Thermal contact sheets are described in U.S. Pat. Nos. 5,107,649 and 5,157,893, hereby incorporated by reference. The sheets are a composite of multiple metal sidewalls which are sealed to enclose a vacuum therein. A spacer is provided between the walls for bracing the sidewalls whereby the spacer may be a plurality of spherical glass or ceramic beads.

The purpose of the thermal contact sheets 12 between the core and the top and bottom variable conductance thermal insulation 14 is to facilitate transfer of heat out of the core into the variable conductance thermal insulation 14. This must be done without electrically short circuiting the battery cells to the metal surface of the variable conductance thermal insulation 14 envelope. Without the thermal contact sheets 12, an electrical insulating material, such as mica, would have to be inserted between the core and the variable conductance thermal insulation 14. This would introduce contact resistances at the core/mica and mica/insulation interfaces which would limit the rate at which heat could be removed from the core.

Reduction of thermal contact resistance by the use of thermal gasketing materials is common in applications near ambient temperature. Such applications include electronics assemblies, in which heat must be conducted from high power components into heat sinks. In the case of high temperature batteries, the normal polymeric/plastic/organic materials cannot withstand the battery internal temperature under the desired multiyear battery life.

Glasses are an ideal candidate for high temperature batteries, based on a combination of low chemical activity and high electrical resistance. However, solid glass has the same problem that a mica sheet would have in terms of thermal contact resistance. The proposed invention solves this problem by introducing a low melting point glass which will be a liquid at the battery's internal operating temperature. By using a liquid phase glass, the battery cell and variable conductance panel surfaces can be wetted to eliminate the thermal contact resistance. The liquid glass may be stabilized by absorption in a support, such as a solid glass cloth/felt sheet. This prevents the liquid glass from flowing away from the interface zones, particularly the top of the core. The thermal resistance of the liquid/solid glass thermal contact sheet 12 is small, due to the thinness of the sheet and the large surface area of the core.

Possible candidates for liquid phase glasses include those used for encapsulation of electronic components, typically made by adding selenium, thallium, arsenic, sulfur, zirconium silicate and zinc borate to conventional glass compositions. (Reference: MATERIALS HANDBOOK, 12th Edition, G. S. Brady and H. R. Clauser, ed.; McGraw Hill, 1986, p. 360). Borosilicate glass and phosphosilicate glass are also candidates for the liquid phase glass. The liquid phase glass chosen should be electrically insulative; vitreous; non-corrosive to common metals, such as mild steel, stainless steel and aluminum; chemically resistant; and resistant to the electrochemical reagents of the cells. The glass may have a melting point between about 100 to about 400 degrees Celsius.

Other glass compositions which make up the low temperature glass in the thermal contact sheet are described in U.S. Pat. No. 3,964,920, which is incorporated by reference. The glass composition comprises a mixture of sealing glass and zirconium silicate in the volume percentage amounts of 50–62 percent of glass and 50–38 percent of zirconium silicate. The glass components comprise, as a percentage weight of the glass alone, $SiO_2$ about 0–2 percent, PbO about 65–72 percent, ZnO about 5–10 percent, $PbF_2$ about 2–10 percent, CdO about 1–5 percent, $TiO_2$ about 0.5–3 percent and $B_2O_3$ about 10–14 percent.

Another glass composition includes that described in U.S. Pat. No. 3,970,464, incorporated by reference. The glasses are described in terms of the following components based on the total oxide composition in the indicated weight percent amount:

| Component | Weight Percent |
| --- | --- |
| ZnO | 52.4–58.5 |
| $B_2O_3$ | 32.4–40.6 | and at least one of the following:

| | |
| --- | --- |
| $Al_2O_3$ | 0–6.7 |
| CaO | 0–3.7 |
| CuO | 0–5.1 |

| | |
|---|---|
| GaO$_2$ | 0–6.7 |
| Y$_2$O$_3$ | 0–6 |
| MgO | 0–2.7 |

Another glass composition includes that described in U.S. Pat. No. 4,315,054, incorporated by reference. A fusion glass of the series SiO$_2$-Al-Na$_2$O$_3$-PbO-Fe$_3$O$_4$ consists essentially of 43.0–46.2% by weight of SiO$_2$; 1.0–2.0% by weight of Al$_2$O$_3$; 6.2–16.0% by weight of Na$_2$O; 33.0–46.1% by weight of PbO; 2.0–4.5% by weight of Fe$_3$O$_4$; and a maximum of 0.2% by weight of Sb$_2$O$_3$, all calculated as percent by weight by oxide.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting and that various changes may be made without departing from the spirit or scope of the invention.

What is claimed is:

1. A high temperature battery comprising:
   a core of battery cells designed to generate electricity electrochemically at a temperature greater than room temperature;
   a housing containing said core; and
   positioned between said core and the housing, an electrically insulating thermal contact member comprising a glass which is solid at ambient temperature and pressure, has a melting point of about 100° C. to 400° C., and is capable of flow at the operating temperature of the cells, said electrically insulating thermal contact member facilitating transfer of heat out of said core.

2. The battery of claim 1 wherein the glass is characterized as an electronic component encapsulating glass.

3. The battery of claim 1 wherein the glass is resistant to the electrochemical reagents of the cells.

4. The battery of claim 1 wherein the glass is characterized as chemically resistant.

5. The battery of claim 1 wherein said electrically insulating thermal contact member further comprises a structural support, said structural support preventing liquid glass from flowing away from said structural support.

6. The battery of claim 5 wherein said structural support comprises a fiberglass cloth or felt sheet.

7. A method of controlling the temperature of a high temperature battery having a core of battery cells designed to generate electricity electrochemically at an operating temperature greater than room temperature and a housing containing said core, comprising positioning between said core and the housing an electrically insulating thermal contact member comprising a glass which is solid at ambient temperature and pressure has a melting point of about 100° C. to 400° C., and is capable of flow at the operating temperature of the cells so that as the battery generates heat during operation, the glass in said electrically insulating thermal contact member liquifies, wetting surfaces of said cells and thereby facilitating heat removal from the cells in a controlled manner.

8. The method of controlling the temperature of a high temperature battery of claim 7 wherein the glass is characterized as an electronic component encapsulating glass.

9. The method of controlling the temperature of a high temperature battery of claim 7 wherein the glass is resistant to the electrochemical reagents of the cells.

10. The method of controlling the temperature of a high temperature battery of claim 7 wherein the glass is characterized as chemically resistant.

11. The method of controlling the temperature of a high temperature battery of claim 7 wherein said electrically insulating thermal contact member further comprises a structural support, said structural support preventing liquid glass from flowing away from said structural support.

12. The method of controlling the temperature of a high temperature battery of claim 10 wherein the structural support comprises a fiberglass cloth or felt sheet.

* * * * *